Sept. 6, 1932.  J. O. DAVIS  1,876,044
LIQUID LEVEL CONTROL
Filed June 4, 1928
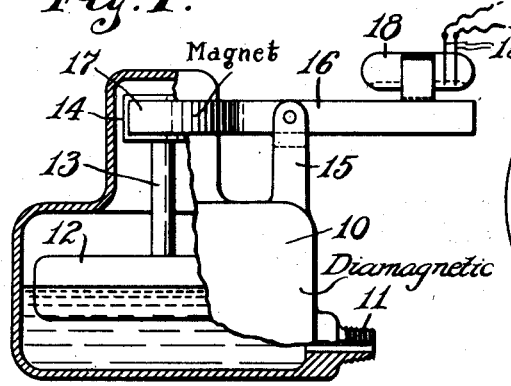
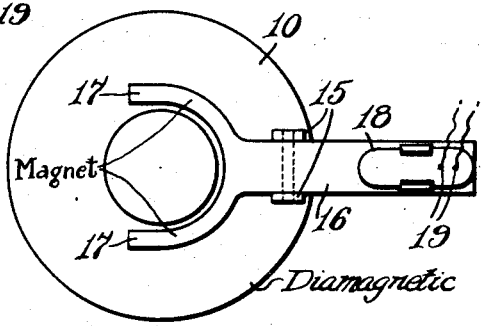
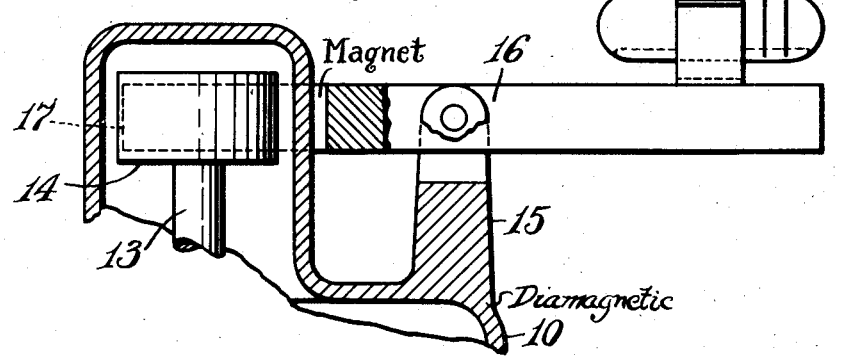
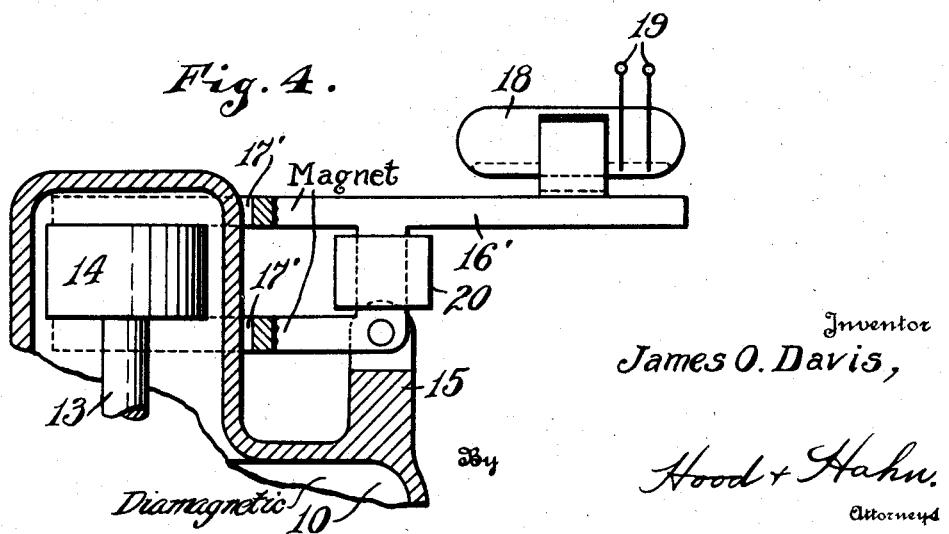
Inventor
James O. Davis,
By
Hood + Hahn.
Attorneys Patented Sept. 6, 1932

1,876,044

UNITED STATES PATENT OFFICE

JAMES O. DAVIS, OF WABASH, INDIANA, ASSIGNOR TO MINNEAPOLIS-HONEYWELL REGULATOR COMPANY, OF WABASH, INDIANA, A CORPORATION OF DELAWARE

LIQUID LEVEL CONTROL

Application filed June 4, 1928. Serial No. 282,821.

The object of my invention is to provide a mechanism readily adaptable to a liquid container, by means of which an electric, or other controlling mechanism may be shifted by variations in liquid level within the container, the construction being such that all packed joints between the liquid level affected element and the movable controlling element are avoided.

The accompanying drawing illustrates my invention:

Fig. 1 is a side elevation, in partial vertical section of my device, Fig. 2, a plan, Fig. 3 is a fragmentary vertical section on a larger scale and Fig. 4 is a similar view of a modification.

In the drawing 10 indicates a small hollow body of non-magnetic material provided at one side with a tubular threaded nipple 11 by means of which the device may be readily applied to a liquid container and communication established between the interiors thereof.

Within the body 10 is a float 12 provided with a stem 13 to the upper end of which is secured a head 14 of magnetic material. Rising from body 10 is a standard 15 upon which is pivoted a controlling member 16 one end 17 of which is bifurcated to straddle the upper end of body 10 in the immediate vicinity of head 14.

The portion 17 of member 16 is also of magnetic material and either portion 17 or head 14 (or both) is magnetized, preferably permanently, although, if desired, the portion 17 may be an electromagnet.

The member 16 may be utilized as a controlling member and in the drawing I have shown one means for accomplishing the desired result, a mercury tube 18 being mounted thereon in such manner that tilting 16 will cause a shifting of the mercury globule into and out of circuit making relation with the terminals 19.

In the form shown in Fig. 4 the member 16', which corresponds to member 16 in Fig. 1, is provided with two portions 17', 17' which are arranged in the vicinity of head 14, and an electrical coil 20 is arranged so as to electrically magnetize the portions 17', 17'.

Because of the magnetic cooperation between head 14 and portion 17, or 17' any vertical movement of float 12, due to a variation in level of the liquid within body 10, will be accompanied by a corresponding shifting of the controller member 16.

I claim as my invention:

1. A liquid-level-affected controller comprising a hollow body provided with a tubular portion for attachment to and communication with the interior of a liquid container, a float arranged within said hollow body and provided with a magnetic portion also within said body, and a controller element movably supported upon said hollow body and provided with a magnetic portion extended into magnetic relation with the magnetic head of the float, and a mercury contact tube mounted directly on said controller.

2. A liquid-level-affected controller comprising a casing adapted for connection to a liquid reservoir, the interior of said casing being in communication with the interior of said reservoir, a coaxial tubular extension on said casing in open communication with the interior of said casing, a float in said casing, a head of magnetic material supported on said float and disposed in said extension, an arm carried on said casing and having a bifurcated end of magnetic material, the furcations of said end lying on opposite sides of said extension, and a circuit controller carried solely on said arm.

3. A liquid-level-affected controller comprising a non-magnetic casing adapted for connection to a liquid reservoir, the interior of said casing being in communication with the interior of said reservoir, a coaxial tubular extension on said casing and integral therewith, said extension being in open communication with the interior of said casing, a float in said casing, a head of magnetic material supported on said float and disposed in said extension, an upstanding post on said casing, a lever pivoted intermediate its ends on the upper end of said post, a magnet on one end of said lever and disposed in cooperative relation with said head, and a mercury tube switch mounted on the other end of said lever.

4. A unitary liquid-level-affected controller adapted for communicating attachment to a liquid reservoir comprising a casing, a float disposed entirely within said casing and including a portion of magnetic material, a lever pivotally mounted on said casing and having a portion of magnetic material cooperatively disposed with relation to the magnetic portion of said float, and a mercury tube switch mounted on said lever.

5. A unitary liquid-level-affected controller adapted for communicating attachment to a liquid reservoir comprising a casing, a float disposed entirely within said casing, a soft iron head carried by said float within said casing, a lever pivotally mounted on said casing, a permanent magnet on said lever cooperatively disposed with relation to said head, and a mercury tube switch mounted on said lever.

6. A unitary liquid-level-affected controller adapted for communicating attachment to a liquid reservoir comprising a casing, a float disposed entirely within said casing, a permanent magnet carried by said float within said casing, a lever pivotally mounted on said casing and having a soft iron portion disposed in cooperative relation with said magnet, and a mercury tube switch carried by said lever.

7. A unitary liquid-level-affected controller adapted for communicating attachment to a liquid reservoir comprising a casing, a float disposed entirely within said casing, an upstanding stem on said float, a head of magnetic material carried on said stem, said stem and head being entirely within said casing, and a controller member pivotally mounted on said casing and comprising a U-shaped member having its arms disposed in cooperative relation with said head and separated by a distance substantially equal to the vertical dimension of said head, an electrically energizable coil disposed about the base of said U-shaped member, and a mercury tube switch mounted on said controller member.

In witness whereof, I, JAMES O. DAVIS have hereunto set my hand at Wabash, Indiana, this 26th day of May, A. D. one thousand nine hundred and twenty eight.

JAMES O. DAVIS.